Sept. 8, 1925.

D. ROSE

GATE VALVE OR THE LIKE

Filed Oct. 15, 1923

1,553,269

Inventor
David Rose
By
James L. Norris
Attorney

Patented Sept. 8, 1925.

1,553,269

UNITED STATES PATENT OFFICE.

DAVID ROSE, OF LINCOLN, ENGLAND.

GATE VALVE OR THE LIKE.

Application filed October 15, 1923. Serial No. 668,706.

*To all whom it may concern:*

Be it known that DAVID ROSE, a subject of the King of Great Britain, residing at Lincoln, England, has invented certain new and useful Improvements in Gate Valves or the like, of which the following is a specification.

The object of this invention is to provide means connectable with a gate or similar valve for allowing a perfect regrinding or facing of the bearing surfaces of the same. When valves of this design have been in use for a period, the corrosive action of steam, water or other substances, wears away the bearing faces so that leakage ensues. To deal with leakage and such defects in gate or similar valves it is usual to remove the chest from the pipe line and turn or face up the bearing surfaces in a lathe or other machine. By this invention means are devised and provided with or applied to a valve which when the valve requires regrinding, may be positioned within the valve seating, and upon which the valve may be accurately revolved to ensure a perfect grinding on the seating and thus obviate the necessity of breaking any of the pipe joints and removing the chest.

The invention will be clearly understood from the following description aided by the examples shown in the annexed drawings, wherein—

Figure 1:
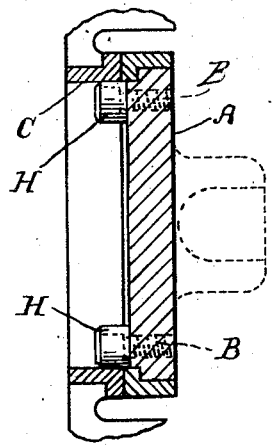
Figure 2:
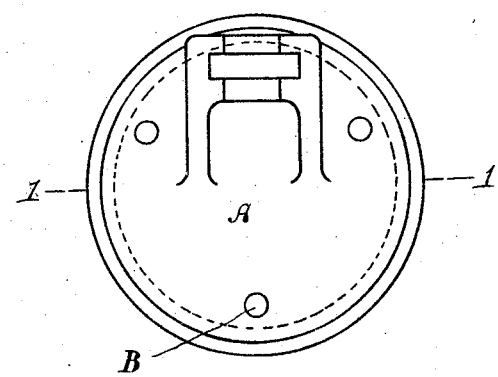

Figure 1 is a sectional view of a valve and seating, the former carrying rollers which extend within the valve seating; Figure 2 is a back view of the valve with rollers reversed; Figs. 3, 4, 5 and 6 are sectional views similar to Fig. 1, showing modifications in the structure.

Referring to Figs. 1 and 2, a valve disc or discs A is provided with a series of screwed pins B having rollers H or their equivalents on a part of their length and projecting therefrom on one side and so arranged that they can be changed over from one side of the disc A to the other when required for regrinding purposes.

These screwed pins B with their roller attachments H are arranged in a circle, and so placed that, when the valve is in its normal working position, the rollers are on the outer side of the disc or discs A as indicated in Figure 2 and form part of the structure of the valve. When it becomes necessary to regrind or face up the surfaces, the valve A is dismantled and the said screws B and rollers H are removed from the rear side of the disc A and screwed in from the opposite side of same (see Figure 1). When this operation is completed the heads or rollers project for some distance beyond the disc face A, and are so disposed on the latter that the rollers or screws can be inserted into the valve ring seating C as shown in Figure 1, and the disc is rotated by hand or other means, in order to fulfill the regrinding operation. The rollers H, being so placed, allow of easy rotation and their position within the valve ring seat C, maintains a perfectly concentric form and alignment, and so keeps the valve A in a true position on its seat C. Both the surfaces of the seat C and valve disc A can then be ground up easily to a perfectly true and accurate bearing.

When the regrinding operation is finished, the screws B and rollers H are removed from the face of the valve A, and screwed into their original position (see Figure 2), on the reverse side of the valve disc A. These rollers form part of the structure of the valve, and are always at hand when required, no separate fittings or tools being necessary.

Figure 3:
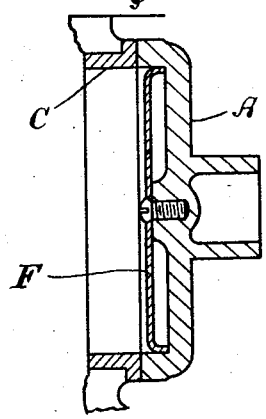
Figure 4:
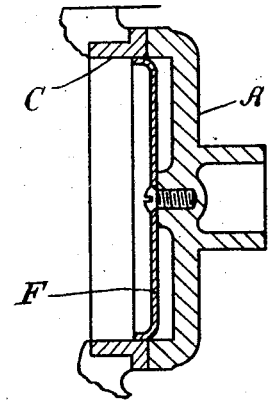
Figure 5:
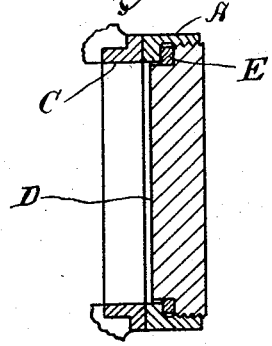
Figure 6:
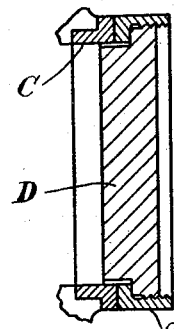

In place of the above mentioned pins B and rollers H I may, as shown by Figures 3 and 4, employ a saucer shaped disc F as the grinding assisting means, such saucer shaped disc F being screwed to the valve proper A which, in this instance, is formed as a complete article; the saucer shaped disc being positioned in a recess in the valve proper A when not required, lying wholly within the recess as at Figure 3 or, when required, projecting as at Figure 4, or I may employ a valve ring A and a disc D of two diameters and provide a bearing ring E as shown by Figures 5 and 6, so that, when the ring E is removed, the disc D can be screwed fully home in the ring A to project as at Figure 6; or projecting wings or other devices may be employed for the same purpose so that a part forms a projection or guide and fits easily into the opening of the valve seat ring C when required for the refacing or regrinding operation.

The plate, ring, or like members can be constructed to carry a cutter or shaping tool, if desired, in order that defective portions of the valve seat may be more rapidly removed than by the mere operation of grinding.

What I do claim as my invention and desire to secure by Letters Patent is:—

1. In combination with a gate or like valve and its seat, means reversibly applicable to the valve and positioned within the valve seat to permit the valve to be revolved thereon for grinding purposes.

2. In combination with a gate or similar valve and its seat, of means removably and reversibly attached to the valve and positioned within the valve seat to permit the valve to be revolved on its seat for grinding purposes.

3. In combination with a gate or similar valve and its seat, of means detachably and reversibly applied to the valve within the valve seat and disposed to keep the valve in concentric alinement for refacing or grinding and to permit the valve to be revolved on its seat.

4. The combination with a gate or like valve and its seat, of removable means applied to and normally carried by the valve and adjustable to project a portion thereof into the seat to provide the valve with a guiding projection for association with the valve seat, to facilitate grinding or refacing of the valve.

5. The combination with a gate or similar valve and its seat, of a plurality of rollers having screw stems detachably applied to the valve and having a reversible application to opposite faces of the valve, the rollers being positioned in one adjustment within the valve seat to permit the valve to be revolved on its seat for grinding purposes.

In testimony whereof I have hereunto set my hand.

DAVID ROSE.